GEORGE W. HEDGES.
Improvement in Friction Clutch.
No. 120,434.                               Patented Oct. 31, 1871.
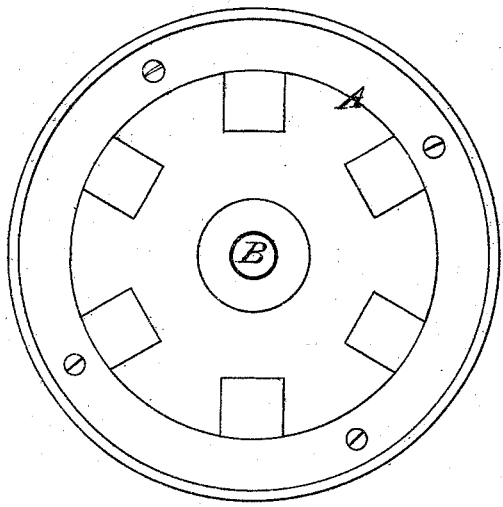 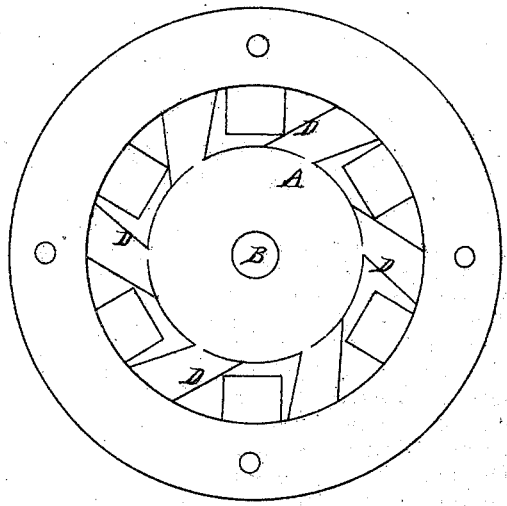
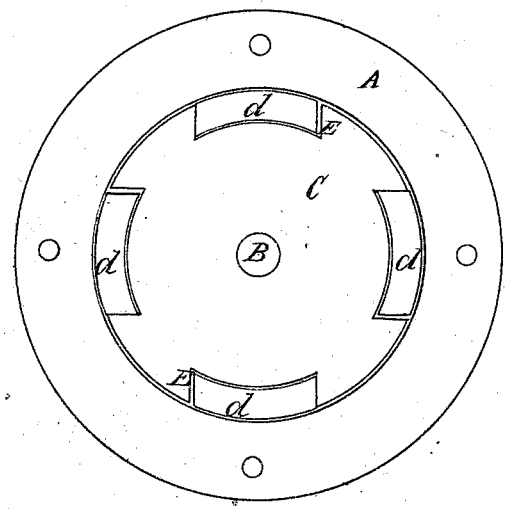 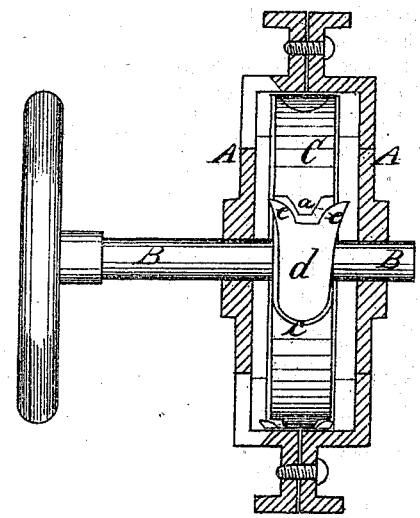
Witnesses.
Geo. H. Strong
John Smith
Inventor.
George W. Hedges

UNITED STATES PATENT OFFICE.

GEORGE W. HEDGES, OF SAN FRANCISCO, CALIFORNIA.

IMPROVEMENT IN FRICTION-CLUTCH.

Specification forming part of Letters Patent No. 120,434, dated October 31, 1871.

*To all whom it may concern:*

Be it known that I, GEORGE W. HEDGES, of San Francisco, in the county of San Francisco and State of California, have invented an Improved Hoisting-Clutch; and I do hereby declare that the following is a full and exact description of the same, reference being had to the accompanying drawing and to the letters of reference marked thereon.

The object of my invention is to provide an improvement in clutches, or that class of mechanism which is so constructed as to allow of motion to a shaft or pulley in one direction while they prevent all motion in an opposite direction. My invention consists in the employment of a circular disk which is firmly secured to a shaft, and is inclosed by two cup-shaped flanges, which are placed loosely upon the shaft, one on each side of the disk, so that their cups or hollow faces are toward the disk, and when they are bolted together they inclose the disk and turn about it. In order to prevent motion in more than one direction, openings are formed in the periphery of the disk and double pawls are loosely placed in these openings. These pawls engage ratchet-teeth on the interior of one and the other of the flanges alternately as the shaft turns.

Referring to the accompanying drawing for a more complete explanation of my invention, Figure 1 is a side elevation of this clutch. Fig. 2 is a view with one of the flanges removed, showing the disk. Fig. 3 is an inside view of one of the flanges. Fig. 4 is an edge view of the disk and section of the flanges, showing the manner of operating the pawls.

Similar letters indicate like parts in the drawing.

A A are two flanges made hollow or cup-shaped and placed loosely upon a shaft, B, with their hollow faces toward each other. C is a disk secured to the shaft B so as to revolve with it and between the two flanges A, which are bolted together so as to inclose the disk and turn loosely about it. The bottom of the cup-shaped hollows or depressions in the flanges is formed into ratchet-teeth D D, so placed that when the flanges are bolted together a tooth on one flange will stand opposite a depression on the other flange alternately. The spaces between the teeth on each flange may be openings entirely through the side, as shown, or they may be simply depressions. The periphery of the disk C is cut out so as to leave any desirable number of deep spaces E, having a tongue, *a*, at one end, and a curved opening, *c*, at the other end. Into these spaces are placed the pawls *d*, which are curved at their front ends to fit into the openings *c*, and have the two points or lugs *e e* projecting at either side at their rear ends so as to be held in their places by the tongue *a* and at the same time have considerable side motion.

The operation will be as follows: When the shaft is turned in one direction the pawls offer no impediment, but move from side to side as they pass the ratchet-teeth D. When it is attempted to move the shaft in an opposite direction the points *e* will engage the teeth D on either one flange A or the other, according to their position at the time of stopping, for as the lugs *e* pass the ratchet-teeth in their forward movement they are alternately forced to one side and the other.

By this arrangement I am enabled to provide a strong, simple, and efficient clutch.

Having thus described my invention, what I claim, and desire to secure by Letters Patent, is—

1. The disk C with its peculiarly-shaped pawls *d*, in combination with the ratchet-flanges A, substantially as and for the purpose herein described.

2. The pawls *d*, holding alternately on one side and the other of the disk C and the operating ratchet-teeth D, each standing opposite to a space between those on the other flange, substantially as described.

In witness whereof I have hereunto set my hand and seal.

GEORGE W. HEDGES. [L. S.]

Witnesses:
GEO. H. STRONG,
JOHN SMITH.

(87)